(12) United States Patent
Dürrer et al.

(10) Patent No.: US 7,083,037 B2
(45) Date of Patent: Aug. 1, 2006

(54) SPLICE CONSTRUCTION FOR ELONGATE SECTIONS

(75) Inventors: Albrecht Dürrer, Vöslau (AT); Johann Imnitzer, Wimpassing (AT)

(73) Assignee: Semperit Aktiengesellschaft Holding, Vienna (AT)

( * ) Notice: Subject to any disclaimer, the term of this patent is extended or adjusted under 35 U.S.C. 154(b) by 0 days.

(21) Appl. No.: 10/853,206

(22) Filed: May 26, 2004

(65) Prior Publication Data
US 2005/0011735 A1    Jan. 20, 2005

(30) Foreign Application Priority Data
May 28, 2003   (AT)   ................ A 825/2003

(51) Int. Cl.
B66B 33/24    (2006.01)
(52) U.S. Cl. ..................................... 198/335
(58) Field of Classification Search ............... 198/335, 198/337, 844.2, 805; 24/31 B, 31 L, 38; 474/253, 254, 257
See application file for complete search history.

(56) References Cited

U.S. PATENT DOCUMENTS

| | | | |
|---|---|---|---|
| 1,996,529 A * | 4/1935 | Skeyhan | ................ 24/38 |
| 2,056,278 A * | 10/1936 | Kuhn | ................ 24/38 |
| 2,182,169 A | 12/1939 | Bierer | |
| 3,481,807 A | 12/1969 | Kanamori | |
| 3,620,346 A | 11/1971 | Brooke et al. | |
| 3,693,218 A | 9/1972 | Jaubert et al. | |
| 3,729,873 A | 5/1973 | Sandell | |
| 3,783,063 A | 1/1974 | Olsson | |
| 3,783,704 A | 1/1974 | Lawson | |
| 4,050,322 A | 9/1977 | Möring | |
| 4,215,516 A | 8/1980 | Huschle et al. | |
| 4,279,676 A | 7/1981 | Morrison et al. | |
| 4,618,387 A | 10/1986 | Fisher et al. | |
| 5,083,985 A | 1/1992 | Alles | |
| 5,172,803 A * | 12/1992 | Lewin | ................ 198/805 |
| 5,531,316 A | 7/1996 | Savino | |
| 5,773,114 A | 6/1998 | Adams | |
| 6,086,806 A | 7/2000 | Weatherall et al. | |
| 6,673,431 B1 * | 1/2004 | Ledzinski | ................ 198/337 |

FOREIGN PATENT DOCUMENTS

| | | |
|---|---|---|
| DE | 19641502 | 4/1998 |
| EP | 0185006 | 6/1986 |
| EP | 0273479 | 7/1988 |
| EP | 1112219 | 5/2003 |
| GB | 1399943 | 7/1975 |
| GB | 2232636 | 12/1990 |
| JP | 08-258934 | 10/1996 |
| JP | 2002-372106 | 12/2002 |
| WO | 01/83167 | 8/2001 |

OTHER PUBLICATIONS

English Language Abstract of JP 08-258934.
English Language Abstract of JP 2002-372106.

* cited by examiner

*Primary Examiner*—Douglas Hess
(74) *Attorney, Agent, or Firm*—Greenblum & Bernstein, P.L.C.

(57) ABSTRACT

The invention relates to an endless, belt-shaped tension element (1) for a conveyor system with at least one joining point (2) comprising an elastomer, in particular a cross-linked and/or thermoplastic elastomer, at least one reinforcing layer and optionally at least one tension support (3), two ends of the at least one reinforcing layer being disposed at the at least one joining point (2). An insert piece (6) is disposed between the two ends at the joining point (2), subtending an angle α with the tension element longitudinal extension, and the ends of the at least one reinforcing layer overlap with the insert piece (6).

26 Claims, 2 Drawing Sheets

SPLICE CONSTRUCTION FOR ELONGATE SECTIONS

CROSS-REFERENCE TO RELATED APPLICATION

The present application claims priority under 35 U.S.C. 119 of Austrian Application No. A 825/2003 filed May 28, 2003, the disclosure of which is incorporated by reference herein in its entirety.

BACKGROUND OF THE INVENTION

1. Field of the Invention

The invention relates to an endless, belt-shaped tension element for a conveyor system with at least one joining point, comprising an elastomer, in particular a cross-linked and/or thermoplastic elastomer, at least one reinforcing layer and optionally at least one tension support, two ends of the at least one reinforcing layer being disposed at the at least one joining point, a conveyor system with a circulating, endless, belt-shaped tension element and a drive system actively connected to the tension element, as well as a method of manufacturing an endless, belt-shaped tension element whereby a tension element section is made from an elastomer, a reinforcing layer is placed in it or on it, after which they are joined to one another by heat treatment, as well as the use thereof.

2. The Prior Art

Belt-shaped tension elements with various different cross-sectional shapes (primarily flat or C-, O-, U-, V-, W- or T-shaped sections) are known from numerous applications, such as conveyor belts for objects or persons, hand rails for escalators and travelators or similar. Typical applications also include bands or belts which are used in many situations to transmit driving power or to transport materials, for example.

In a known manner, belt conveyors consist of a circulating endless belt, which is partially supported by pulley blocks at the two oppositely lying end regions of the belt. To date, it has been standard practice to use separate guide rollers with belt conveyors in order to prevent the belt from migrating sideways. Endless conveyor belts are usually made from a composite material combining rubber and/or plastic with woven fabric and, for reinforcing purposes, incorporate woven fabric, non-woven materials or steel inserts and, depending on the application, one or more tension supports to increase breaking strength in the direction in which they are subjected to stress. In order to make the endless belt, there must be at least one point at which the two oppositely lying ends of the belt are joined.

Hand rails are used with escalators, travelators and similar applications as safety features for conveying persons. To this end, the hand rail must provide the passenger with a secure grip and be capable of withstanding dynamic stress and environmental influences during operation without being damaged. The endless hand rails known from the prior art are joined by various possible means and are usually made from a plurality of different materials in order to meet these requirements. The hand rail surface with which the passenger comes into contact is usually made from an elastomer blend. The top of the hand rail also protects components disposed underneath from various environmental influences and must therefore be resistant to them. It is standard practice to use reinforcing layers such as woven fabrics, fabric cords, mixtures reinforced with short fibres, etc., as a means of increasing the dimensional stability of the hand rail cross section. The hand rail is expected to have as long as possible a service life.

To render it capable of absorbing longitudinal forces in its cross section, the hand rail usually contains what might be termed tension supports, which must have a defined minimum tearing resistance, including in the butt region.

Finally, the so-called anti-friction layer forms the contact surface with the hand rail guide system and for the hand rail drive system.

Tension elements are also known which are made by a plastic extrusion process.

What all these tension elements have in common is the property whereby on bending, the components disposed at the farthest distance from the neutral axis are subjected to a particularly high degree of stress.

In this connection, taking an open section with a C-shaped cross section as mentioned above, it is evident that the fabric layer at the exposed points will be subjected to a particularly high degree of stress. Stresses are known to be caused by changes in bending at different frequencies, when the bending radii may be a single digit multiple of the component height. This bending occurs when axial tension is applied. The main requirements of flexibility and dimensional stability must there be selected within very narrowly specified tolerance ranges because the component is subject to strict safety regulations.

The fact that a maximum stiffness of the component at prescribed bending radii must not exceed or fall below a specific tolerance leads to extreme states of tension and these 3-dimensionally acting forces are dissipated at the weakest point of the material join. As a rule, they are to be found wherever there are butt/splice joints, primarily in the fabric layers.

In order to make allowance for this situation, some quite complex splice constructions have been proposed in the prior art as a means of minimising points which are susceptible to damage. For example, the two ends of a fabric web are cut at an angle, overlapped in one region and then joined to one another in this overlapping region, for example bonded.

SUMMARY OF THE INVENTION

The present invention provides an endless, belt-shaped tension element for a conveyor system comprising: a belt-shaped tension element section having a longitudinal axis and comprising an elastomer, at least one reinforcing layer, two ends of the at least one reinforcing layer being disposed at at least one joining point, an insert piece at the at least one joining point between two ends of the at least one reinforcing layer at an angle α relative to the longitudinal axis of the tension element section, the two ends of the at least one reinforcing layer being disposed so as to overlap with the insert piece.

A further aspect of the invention provides a method of producing an endless, belt-shaped tension element comprising: providing at least one reinforcing layer on or in a belt-shaped tension element section, the belt-shaped tension element section having a longitudinal axis and comprising an elastomer, joining the tension element section and the at least one reinforcing layer to one another by heat treatment, inserting an insert piece at a joining point between two ends of the at least one reinforcing layer at an angle α relative to a longitudinal axis of the tension element wherein the ends of the at least one reinforcing layer overlap with and are joined to the insert piece thereby making the endless belt-shaped tension element.

Another aspect of the invention provides an endless, belt-shaped tension element, wherein the angle α has an upper limit of 25° and a lower limit of 75°.

Another aspect of the invention provides an endless, belt-shaped tension element, wherein the angle α has an upper limit of 30° and a lower limit of 70°.

Yet another aspect of the invention provides an endless, belt-shaped tension element, wherein the angle α has an upper limit of 35° and a lower limit of 65°.

A further aspect of the invention provides an endless, belt-shaped tension element, wherein the angle α has an upper limit of 35° and a lower limit of 45°.

Yet another aspect of the invention provides an endless, belt-shaped tension element, wherein the insert piece has a width with a lower limit of 3 cm and an upper limit of 2 m.

Another aspect of the invention provides an endless, belt-shaped tension element, wherein the width of the insert piece has a lower limit of 5 cm and an upper limit of 50 cm.

Yet another aspect of the invention provides an endless, belt-shaped tension element, wherein the width of the insert piece has a lower limit of 10 cm and an upper limit of 15 cm.

A further aspect of the invention provides an endless, belt-shaped tension element, wherein the overlap has a width with a lower limit of 3 mm and an upper limit of 1 m.

A further aspect of the invention provides an endless, belt-shaped tension element, wherein the width of the overlap has a lower limit of 5 mm and an upper limit of 50 cm.

Another aspect of the invention provides an endless, belt-shaped tension element, wherein the width of the overlap has a lower limit of 8 mm and an upper limit of 10 cm.

Yet another aspect of the invention provides an endless, belt-shaped tension element, wherein the width of the overlap has a lower limit of 8 mm and an upper limit of 12 mm.

Another aspect of the invention provides an endless, belt-shaped tension element, comprising an overlapping region between the at least one reinforcing layer and the belt-shaped tension element section lying on a non-visible side when the tension element is mounted.

Yet another aspect of the invention provides an endless, belt-shaped tension element, wherein the at least one reinforcing layer is an anti-friction layer or stiffening layer, at least in certain regions.

A further aspect of the invention provides an endless, belt-shaped tension element, wherein the at least one reinforcing layer is in the form of a woven fabric and/or non-woven material, at least in certain regions.

Another aspect of the invention provides an endless, belt-shaped tension element, wherein at least certain regions of the anti-friction layer are made from at least one of woven fabric of synthetic fibers, natural fibers, or mixtures thereof.

Yet another aspect of the invention provides an endless, belt-shaped tension element, wherein the at least one reinforcing layer between the two ends is a continuous web of woven fabric.

A further aspect of the invention provides an endless, belt-shaped tension element, wherein the at least one reinforcing layer comprises a contact to a guide or drive system.

Another aspect of the invention provides an endless, belt-shaped tension element, wherein the woven fabric is composed of warp and weft threads.

Yet another aspect of the invention provides an endless, belt-shaped tension element, wherein at least one intermediate layer is disposed between the insert piece and the at least one reinforcing layer.

A further aspect of the invention provides an endless, belt-shaped tension element, wherein oppositely lying ends of the at least one reinforcing layer comprises teeth.

Yet another aspect of the invention provides an endless, belt-shaped tension element, wherein a magnetic or magnetizable element is disposed in and/or on the belt-shaped tension element section.

A further aspect of the invention provides an endless, belt-shaped tension element, wherein the elastomer is at least partially composed of a polymeric material.

Another aspect of the invention provides an endless, belt-shaped tension element, wherein polymeric material is made by press vulcanization or extrusion.

Yet another aspect of the invention provides a conveyor system including a circulating, endless, belt-shaped tension element and a drive system actively connected to the tension element.

In yet a further aspect of the invention, the method includes the insert piece which is composed of a same material as the at least one reinforcing layer.

Another aspect of the invention provides a method wherein the ends of the at least one reinforcing layer are at least one of bonded, stitched, welded, fused, or clamped to the insert piece.

A further aspect of the invention provides a combination comprising the endless, belt-shaped tension element and a conveyor belt.

Yet another aspect of the invention provides an endless, belt-shaped tension element, comprising a hand rail for an escalator or a travelator.

Another aspect of the invention provides an endless, belt-shaped tension element, which further includes at least one tension support, wherein the tension support is a steel cord, sheet steel or an aramide cord.

A further aspect of the invention provides an endless, belt-shaped tension element, wherein the at least one joining point comprises a cross-linked and/or thermoplastic elastomer.

A further aspect of the invention provides an endless, belt-shaped tension element, wherein the synthetic fibers are composed of polyamide or polyester.

Another aspect of the invention provides an endless, belt-shaped tension element, wherein the natural fibers are composed of cotton.

Yet another aspect of the invention provides an endless, belt-shaped tension element, wherein the elastomer is a thermoplastic elastomer comprising TPE-U, TPE-V, TPE-O, TPE-S, TPE-A, or TPE-E.

A further aspect of the invention provides an endless, belt-shaped tension element, wherein the elastomer is a rubber or a latex.

Another aspect of the invention provides a method wherein the insert piece is formed by cutting off an end piece of the at least one reinforcing layer.

Yet another aspect of the invention provides an endless, belt-shaped tension element, wherein the overlapping region between the at least one reinforcing layer and the belt-shaped tension element section is on the side directed towards a drive system.

A further aspect of the invention provides an endless, belt-shaped tension element, wherein the at least one reinforcing layer is formed by press vulcanization or extrusion.

Another aspect of the invention provides an endless, belt-shaped tension element, wherein the thermoplastic elastomer is formed by press vulcanization or extrusion.

The objective of the invention is to extend the service life of belt-shaped tension elements. Another part-objective of the invention is to minimise susceptibility of the tension element to failure during operation as a result of breakage at the joining points of the fabric.

The objectives of the invention are each independently achieved by means of an endless, belt-shaped tension element for a conveyor system of the type outlined above, in which an insert piece is disposed at an angle a relative to the longitudinal extension of the tension element at the joining point between the two ends, and the ends of the at least one reinforcing layer are arranged so that they overlap with the insert piece, and by a conveyor system of the type outlined above, as well as a method of producing an endless, belt-shaped tension element, whereby the endless belt is made using an insert piece at the joining point between the two ends of the reinforcing layer disposed at an angle a relative to the longitudinal extension of the tension element, and the ends of the at least one reinforcing layer are arranged so that they overlap with the insert piece and are joined, and the use thereof. The advantage of this approach is that it significantly extends the service life of the tension element because the joining points are capable of withstanding higher mechanical stress and thus guarantee high operating reliability. Another advantage is the fact it guarantees both high flexibility and dimensional stability in tolerance ranges specified for the ends of the tension element.

It has also proved to be of advantage if the angle α is selected from a range with a lower limit of 25°, preferably 30°, in particular 35°, and an upper limit of 75°, preferably 70°, in particular 65°, and in particular is 45°, which increases the breaking resistance of the tension element with respect to prevailing stress.

In one embodiment, the width of the insert piece is selected from a range with a lower limit of 3 cm, preferably 5 cm, in particular 10 cm, and an upper limit which is endless, preferably 2 m, in particular 50 cm, and in particular is 15 cm, obtaining as uniform a possible thickness of the tension element cross section across the entire length of the tension element, which therefore results in a regular surface, thereby improving the feeling of the tension element to the touch, in particular the hand rail.

In another embodiment of the tension element, the width of the overlap is selected from a range with a lower limit of 3 mm, preferably 5 mm, in particular 8 mm, and an upper limit of 1 m, preferably 50 cm, in particular 10 cm, and in particular is 12 mm, so that the multi-layering of the insert piece and the ends of the reinforcing element in the tension element extends over only a short length relative to the total length of the tension element, thereby resulting in only a slight increase in the height of the tension element.

It has also proved to be of advantage that the overlapping region lies between the fabric layer and the elastomer, in particular along the side that is not visible when the tension element is in the mounted position, but preferably on the side directed towards the drive system, which enables the breaking resistance and hence service life of the tension element to be improved still further.

At least certain regions of the reinforcing layer may be an anti-friction layer or a stiffening layer, which on the one hand improves movement of the tension element on a drive system and also keeps the deformability of the tension element within limits, thereby ensuring dimensional stability. Also of advantage is the fact that sliding friction with respect to the guide system is not so high as a result of providing the anti-friction layer but the adhesive friction is nevertheless sufficient for a drive system.

It has also proved to be of advantage that the reinforcing layer is made from a woven fabric and/or non-woven material, at least in certain regions, thereby enabling high mechanical stresses to be compensated and rendering it capable of withstanding high loads, which increases the tearing resistance of the tension element without restricting the flexibility of the tension element.

In another embodiment, the anti-friction layer is made from a woven fabric of synthetic fibres, at least in certain regions, for example polyamide, polyester, etc. and/or from natural fibres, for example cotton, or mixtures thereof, which means that the sliding friction with respect to the guide system is not so high on the one hand, whilst the adhesive friction is sufficiently high for a drive system on the other.

Also of advantage is the fact that the reinforcing layer between the two ends is provided in the form of a continuous fabric web, thereby keeping the number of joining points as low as possible and as a result minimising potential breaking points. Another advantage is that manufacture of the tension element can be simplified, thereby reducing costs.

Also of advantage is the fact that the reinforcing layer provides a contact with a guide or drive system, which on the one hand guarantees a high degree of dimensional stability whilst on the other obviates the need for additional elements between the drive system and reinforcing layer in order to drive the belt-shaped tension element.

In another embodiment, the woven fabric is made up of warp and weft threads, as a result of which the endless belt-shaped tension element is able to withstand higher stress. It is also of advantage if, for example, the same fabric is used for the reinforcing layer and the inset piece, which enables the warp thread directions of the reinforcing layer and the insert piece to be oriented in a specific way.

In another embodiment, at least one intermediate layer is disposed between the insert piece and the reinforcing layer, in particular an intermediate plate, enabling an additional joining element to be provided between the two end pieces of the tension element, thereby improving the join and rendering it more durable.

In another embodiment, the oppositely lying ends of the at least one reinforcing element has toothing, which improves non-positive and/or positive transmission of the motion energy across the entire length of the tension element, increasing the breaking strength of the joining point as a result.

The tension support may be a steel cord, a sheet steel or an aramide cord or similar, enabling longitudinal forces acting on the tensional element to be absorbed. As a point of attack for the drive system, it may also be of a reinforced design.

It is also of advantage to provide a magnetic or magnetisable element in and/or on the tension element because this will enable a large number of elements connecting to the tension element and a large number of mechanical moving elements to be dispensed with in the drive system.

The tension element is made at least partially from a polymeric material, for example thermoplastic elastomers such as TPE, e.g. TPE-U, TPE-V, TPE-O, TPE-S, TPE-A, TPE-E, etc., or an elastomer, such as rubber, latex materials, thereby making the tension element inexpensive to manufacture, the materials used for the purpose of the invention thereby giving the tension element a long service life.

In another embodiment, the tension support and/or at least the reinforcing layer and/or the thermoplastic elastomer or plastic is produced by press vulcanisation or by extrusion, in which case the shape of the tension element has only slight tolerances. This also ensures that the individual elements of the tension element are effectively stabilised.

In another embodiment of the method, the insert piece constitutes the reinforcing layer, in particular by cutting off an end piece thereof, which imparts to the endless belt-shaped tension element a higher capacity to withstand stress because the warp threads of the reinforcing layer and the insert piece also subtend the angle α, which reduces the stocks needed for manufacturing the tension element because additional components for the reinforcing layer can be dispensed with.

The fact that the ends of the reinforcing layer are bonded and/or stitched and/or welded and/or fused and/or clamped to the insert piece is also of advantage because this increases the breaking strength of the tension element enabling the use of a universal joining method which can be adapted to suit individual circumstances, which means that the tension element can be assembled directly at the site where it is to be deployed, in addition to which the joining point may also be of a detachable design.

The endless belt-shaped tension element may advantageously be used as a conveyor belt, in particular for a belt conveyor or as a hand rail on an escalator or travelator, because it offers a system with a high degree of operating reliability which also has a long service life.

BRIEF DESCRIPTION OF THE DRAWINGS

The present invention will be described in the following text by the exemplary, non-limiting embodiments shown in the figures, wherein.

DETAILED DESCRIPTION OF PREFERRED EMBODIMENTS

Figure 1:
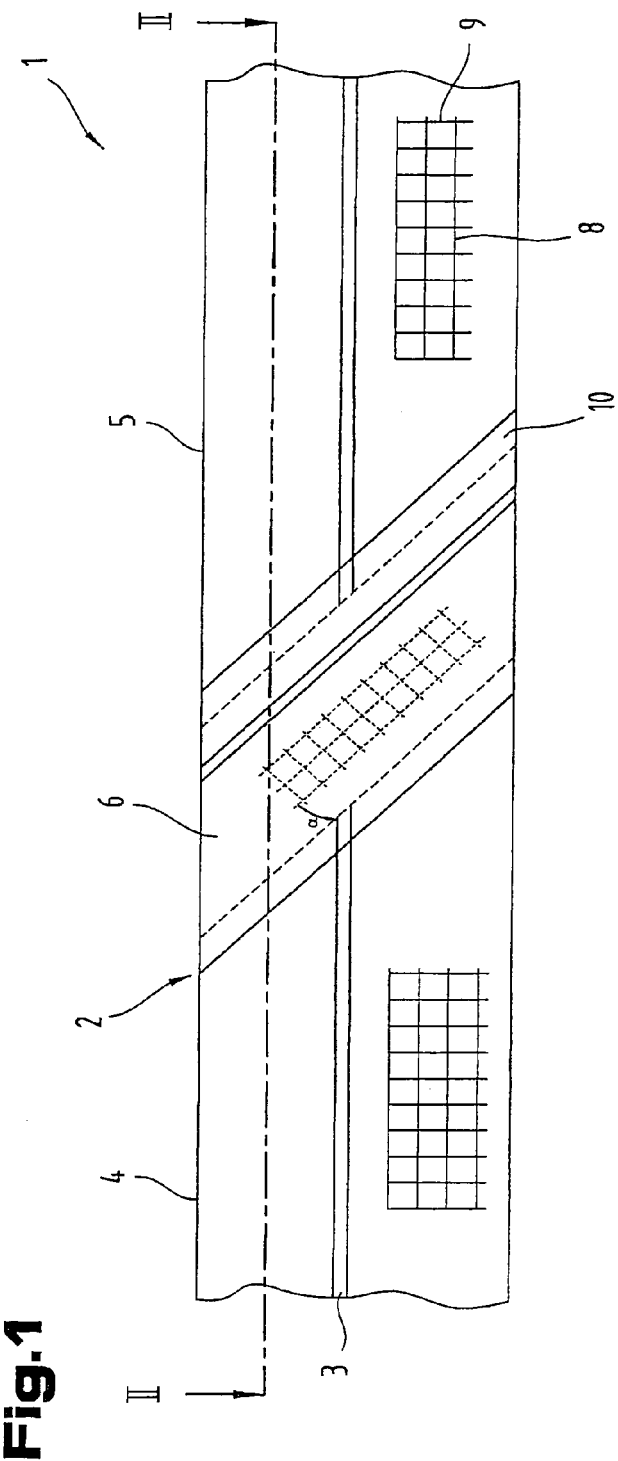
FIG. 1 is a schematic diagram of the butt construction.

Firstly, it should be pointed out that the same parts described in the different embodiments are denoted by the same reference numbers and the same component names and the disclosures made throughout the description can be transposed in terms of meaning to same parts bearing the same reference numbers or same component names. Furthermore, the positions chosen for the purposes of the description, such as top, bottom, side, etc., relate to the drawing specifically being described and can be transposed in terms of meaning to a new position when another position is being described. Individual features or combinations of features from the different embodiments illustrated and described may be construed as independent inventive solutions or solutions proposed by the invention in their own right.

FIG. 1 illustrates a length of an endless belt-shaped tension element 1, providing a schematic detailed view of the joining point 2 between the two ends of the tension element 1.

The tension element 1 is made from an elastomer, in particular a thermoplastic elastomer, on or in which a reinforcing layer is provided, in particular joined to the elastomer. In order to increase the forces which can be absorbed by the tension element 1, e.g. tearing strength, at least one tension support 3 (not illustrated in FIG. 1) may be provided on or preferably in the elastomer if necessary.

Depending on the manufacturing process, the reinforcing layer is normally an endless belt and therefore has two oppositely lying ends which have to be joined to one another in order to make the endless tension element 1.

The two oppositely lying ends of the reinforcing layer, which may be made from a fabric, are denoted as section A1 4 and section A2 5. If the reinforcing layer is continuous, the illustrated sections A1 4 and A2 5 of the reinforcing layer may also be made from a continuous web of fabric, in which case A1 4 is the same as A2 5, i.e. there is only one section A1 4 or A2 5.

As proposed by the invention, an insert piece 6 is disposed between the section A1 4 and section A2 5.

The length ratio of the individual sections A1 4 and A2 5 of the reinforcing layer can be freely selected, i.e. section A1 4 may be bigger than the insert piece 6 or the insert piece 6 may be bigger than the section A1 4. The same applies to section A2 5.

To be absolutely clear, as explained above, the reinforcing layer may be made up of more than one piece, resulting in several joining points 2, and the lengths specified for the sections relate to these multiple pieces.

The reinforcing layer may be provided in the form of an anti-friction layer 7, at least in certain regions.

Instead of using fabric, it would also be possible to use a non-woven material or netting, etc., for the reinforcing layer.

The fabric described in respect of FIG. 1 consists of longitudinally extending weft threads 9 and warp threads 8 extending transversely thereto, which are preferably oriented at right angles to one another. Other angular ratios would also be conceivable, such as warp and weft threads 8,9 disposed in a lozenge pattern, so that although the right-angled approach is preferred, it should not be construed as limiting the scope of the invention in any way.

The insert piece 6 preferably consists of a woven fabric with warp and weft threads 8, 9. For the purposes of the invention, it is placed at an angle α relative to the longitudinal extension of the tension element or warp thread direction.

An overlapping region 10 is formed between section A1 4 and section A2 5 and the insert piece 6 at the side directed towards the respective section A1 4 or section A2 5.

The width of this overlapping region 10 between sections A1 4 and A2 5 and the insert piece 6 may be variable but is preferably selected from a range with an upper limit of 3 mm, preferably 5 mm, in particular 8 mm, and an upper limit of 1 m, preferably 50 cm, in particular 10 cm, and in particular is 12 mm.

Figure 2:
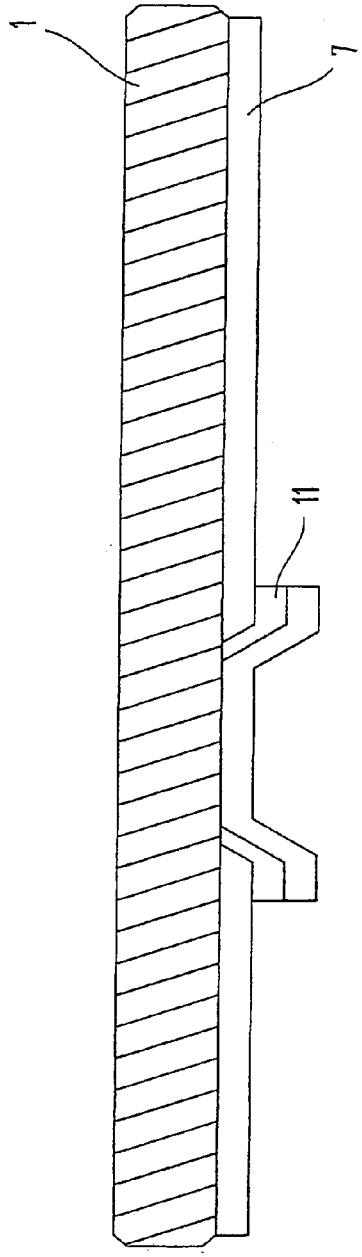
FIG. 2 shows a section through the butt construction.

As illustrated in FIG. 2, an intermediate plate 11 may be inserted in the overlapping region 10 between section A1 4 and A2 5. This intermediate plate 11 serves as an additional joining element between the insert piece 6 and the sections A1 4 and A2 5. The intermediate plate 11 may be a rubber layer or a plate made from any elastomeric or thermoplastic material, for example, such as NR, CR, SBR, T-PES. As alternative adhesives, it would also be possible to use other highly tough elastic adhesives, such as those with an epoxy, methacrylate or polyurethane base, etc., for example. In addition or as an alternative to this type of bonding, sections A1 4 and A2 5 and the insert piece 6 could also be joined by stitched butt seams, welding, fusion and/or clamps. Such splice joins may be used for both hand rails made from conventional cross-linked elastomers and from thermoplastic elastomers.

The yarns used for the fabric pieces may be either synthetic fibres such as polyamide or polyester, etc. for example and/or natural fibres such as cotton, sisal, hemp, for example.

The edges of sections A1 4 and A2 5 and the edges of the insert piece 6 subtend an angle β. The dimensions of the angle β are variable and are preferably selected form a range with an upper limit of less than 90°, in particular 45°, and a lower limit of 30°, preferably 35°, in particular 45°.

The angle between the tension element longitudinal axis and the insert piece longitudinal axis is denoted as angle α. In a preferred embodiment, the angle α is 45°, although there may be slight variations due to the production technique, e.g. due to the cutting technique. The warp thread directions of sections A1 4 and A2 5 and the warp thread directions of the insert piece 6 extend at an angle α relative to one another. This angle α preferably has a value of less than 90°.

Figure 3:
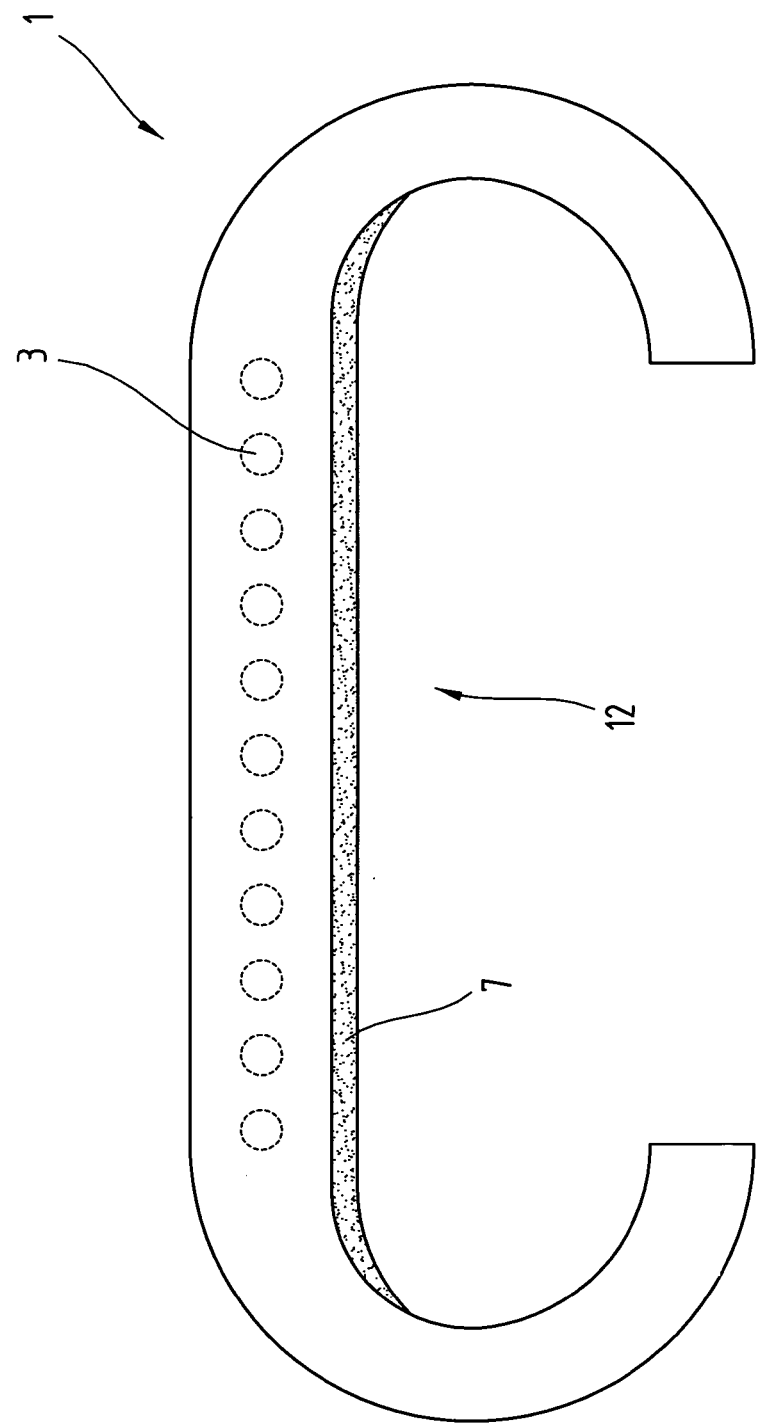
FIG. 3 is a cross section of a tension element as proposed by the invention in the form of a hand rail.

The endless belt-shaped tension element 1 produced by the joining method proposed by the invention may be used as a hand rail, as illustrated in FIG. 3, for escalators, travelators and similar. With hand rails of this type, it is standard practice to use tension supports 3 as mentioned above, which may be a steel cord, steel belt and/or aramide cord. If necessary, additional fabric layers may also be provided, e.g. stiffening inserts, anti-friction layers 7, etc., which may also be provided in the form of the above-mentioned reinforcing layer.

The elastomer used may be a polymeric material, e.g. thermoplastic elastomer, such as TPE, e.g. TPE-U, TPE-V, TPE-O, TPE-S, TPE-A, TPE-E, etc., or alternatively rubber or various types of latex.

A structure for a hand rail of this type is defined in EN 115 as being a "driven belt designed for passengers to hold onto".

The anti-friction layer 7 may run in a guide system on the one hand, in which case it is at least partially in contact with the latter, and on the other hand the anti-friction layer 7 may also be in contact with the tension element drive system.

The anti-friction layer 7 may have a certain amount of flexing capacity in the longitudinal direction, i.e. in the direction of conveyance, in order to improve the flexibility of the tension element 1. The anti-friction layer 7 has a low sliding friction value with respect to the guide system on the one hand and a sufficiently high adhesion friction value with respect to the drive system on the other hand, to ensure that the tension element 1 can be driven without any problems.

The ends of the sections A1 4 and A2 5 and the boundaries of the insert piece 6 must not have any smooth edges and in effect may also have toothing for example, thereby enabling better meshing of the edges of the fabric sections A1 4 and A2 5 and insert piece 6.

To improve contact between the tension element 1 and the drive system, a magnetic or magnetisable element may be inserted in the tension element 1.

The tension element 1 may also incorporate a tension support 3, the purpose of which is to absorb longitudinal forces acting on the tension element 1 as a result of the drive system. The tension support 3 has a defined minimum tearing strength. Different materials may be used as the material for this tension support 3 depending on the drive system, such as steel, aramide cords, steel belts, etc., for example. The tension support 3 may be of a single-piece or alternatively a multi-piece design, for example comprising wire elements disposed at least substantially parallel with one another in the direction of conveyance. The tension support 3 may also be disposed in or alternatively on the tension element 1.

Other reinforcing inserts are often used in hand rails known from the prior art as a means of improving dimensional stability, such as fabric cords or similar, for example, thereby avoiding any increase or reduction in the cross section. This advantageously avoids both noise generated on contact with the guide system and an excessive build-up of heat, thereby largely preventing drive problems and ultimately destruction of the tension element 1 which could otherwise occur. The fact of not increasing the size of the tension element 1 also prevents individuals from becoming trapped in the intermediate space that would result between the tension element 1 and a system used to guide it.

The anti-friction layer 7 extends across at least the greater part of the tension element 1.

The tension element 1 was dynamically tested using a device specially developed for this purpose in an air-conditioned chamber. Tests were conducted on a test bed with different bending diameters specifically designed for conducting tests with a view to obtaining flexible elongate sections with a C-shaped cross section. The section length on the test bed is approximately 17 m. The test bed is fitted with 4 wheels, of which 2 wheels have a diameter of 780 mm and two wheels a diameter of 550 mm, a roller with a diameter of 70 mm and a roller curvature (r-450 mm; roller diameter equals 70 mm). The test speed is 5 m/sec. The minimum bending radius is 275 mm for both positive and negative bending, at a bending frequency of 0.2 Hz, which in turn corresponds to 12 bends per minute. A total of 1.5 million bending cycles were tested altogether at an ozone concentration of 20 pphm, an initial tension in the section of 2000 N, at an ambient temperature of 45° C. and a relative air humidity of 90%. This test bed was used to test how many bending cycles the joining point 2 of the tension element 1 proposed by the invention could withstand. The number of bending cycles of the join proposed by the invention proved to be well above the value which can be achieved by the tension elements 1 known from the prior art. The endless belt-shaped tension element 1 proposed by the invention was tested for a test period of more than 2000 hours, during which no signs of wear at the joining point 2 were observed at all.

The insert piece 6 may be used both on the bottom and from the top. In a preferred embodiment, the fabric piece is disposed outside, i.e. towards the guide rail or the side directed towards the bottom face 12 of the tension element 1, as illustrated in FIG. 3. In an alternative embodiment, the insert piece 6 is disposed inside in the region overlapping 10 with section A1 4 and outside in the region overlapping 10 with section A2 5, or conversely. It would naturally also be conceivable for the insert piece 6 to be disposed inside only, i.e. towards the elastomer.

Instead of the fabric layer, it would also be possible to incorporate a non-woven layer. In order to increase the tensile strength of the non-woven material, it may be applied on top of a lattice, for example, and then placed in or on the tension element 1.

The examples of embodiments illustrate possible variants of the tension element 1 and it should be pointed out at this stage that the invention is not necessarily restricted to the embodiments specifically illustrated here and instead, the individual features may be used in various different possible combinations, which possibilities will be within the reach of the person skilled in this technical field in conjunction with the technical teaching of the invention. Various other embodiments would also be conceivable, based on combinations of individual details of the embodiments described and illustrated, without departing from the scope of the invention, and repeat descriptions of these will not be given.

The embodiments illustrated as examples show possible variants of the tension element 1 and it should be pointed out at this stage that the invention is not restricted to the actual embodiments specifically illustrated. The individual embodiments may be combined with one another and these possible variations will be within the ability of the person skilled in this field in conjunction with the technical teaching of the invention. Consequently, all conceivable embodiments which can possibly be achieved by combining individual details from the illustrated and described embodiments are included within the scope of the invention.

For the sake of good order, it should finally be pointed out that in order to provide a clearer understanding of the structure of the tension element 1, it and its constituent parts are illustrated to a certain extent out of proportion and/or on an enlarged scale and/or on a reduced scale.

The objectives underlying the inventive solutions may be found in the description.

Above all, the individual embodiments illustrated in FIGS. 1, 2; 3 may be construed as independent solutions proposed by the invention in their own right. The objectives and associated solutions proposed by the invention may be found in the detailed description of these drawings.

LIST OF REFERENCE NUMBERS

1 Tension element
2 Joining point
3 Tension support
4 Section A1
5 Section A2
6 Insert piece
7 Anti-friction layer
8 Warp thread
9 Weft thread
10 Overlapping region
11 Intermediate plate
12 Bottom face

What is claimed is:

1. Endless, belt-shaped tension handrail element for an escalator or travelator system comprising: a belt-shaped tension element section having a longitudinal axis and comprising an elastomer, at least one reinforcing layer, two ends of the at least one reinforcing layer being disposed at at least one joining point, an insert piece at the at least one joining point between two ends of the at least one reinforcing layer at an angle α relative to the longitudinal axis of said tension element section, said two ends of the at least one reinforcing layer being disposed so as to overlap with said insert piece thereby forming said endless, belt-shaped tension handrail element.

2. Endless, belt-shaped tension handrail element as claimed in claim 1, wherein the angle α has an upper limit of 25° and a lower limit of 75°.

3. Endless, belt-shaped tension handrail element as claimed in claim 1, wherein the insert piece has a width with a lower limit of 3 cm and an upper limit of 2 m.

4. Endless, belt-shaped tension handrail element as claimed in claim 1, wherein said overlap has a width with a lower limit of 3 mm and an upper limit of 1 m.

5. Endless, belt-shaped tension handrail element as claimed in claim 1, comprising an overlapping region between said at least one reinforcing layer and said belt-shaped tension element section lying on a non-visible side when the tension element is mounted.

6. Endless, belt-shaped tension handrail element as claimed in claim 5, wherein said overlapping region between said at least one reinforcing layer and said belt-shaped tension element section is on the side directed towards a drive system.

7. Endless, belt-shaped tension handrail element as claimed in claim 1, wherein the at least one reinforcing layer is an anti-friction layer or stiffening layer, at least in certain regions.

8. Endless, belt-shaped tension handrail element as claimed in claim 7, wherein at least certain regions of said anti-friction layer are made from at least one of woven fabric of synthetic fibers, natural fibers, or mixtures thereof.

9. Endless, belt-shaped tension handrail element as claimed in claim 1, wherein the at least one reinforcing layer between the two ends is a continuous web of woven fabric.

10. Endless, belt-shaped tension handrail element as claimed in claim 1, wherein the at least one reinforcing layer comprises a contact to a guide or drive system.

11. Endless, belt-shaped tension handrail element as claimed in claim 1, wherein the at least one reinforcing layer is in the form of a woven fabric and/or non-woven material, at least in certain regions.

12. Endless, belt-shaped tension handrail element as claimed in claim 11, wherein the woven fabric is composed of warp and weft threads.

13. Endless, belt-shaped tension handrail element as claimed in claim 1, wherein at least one intermediate layer is disposed between the insert piece and the at least one reinforcing layer.

14. Endless, belt-shaped tension handrail element as claimed in claim 1, wherein oppositely lying ends of the at least one reinforcing layer comprises teeth.

15. Endless, belt-shaped tension handrail element as claimed in claim 1, wherein a magnetic or magnetizable element is disposed in and/or on said belt-shaped tension element section.

16. Endless, belt-shaped tension handrail element as claimed in claim 1, wherein the elastomer is at least partially composed of a polymeric material, said polymeric material can be a thermoplastic elastomer selected from the group consisting of TPE-U, TPE-V, TPE-O, TPE-S, TPE-A, and TPE-E; or an elastomer selected from the group consisting of rubber and latex materials.

17. Endless, belt-shaped tension handrail element as claimed in claim 16, wherein the polymeric material is made by press vulcanization or extrusion.

18. Conveyor system including a circulating, endless, belt-shaped tension handrail element and a drive system actively connected to the tension element, wherein the endless, belt-shaped tension handrail element is as claimed in claim 1.

19. A combination comprising the endless, belt-shaped tension handrail element as claimed in claim 1 and a conveyor belt.

20. A combination comprising the endless, belt-shaped tension handrail element as claimed in claim 1 and an escalator or a travelator.

21. Endless, belt-shaped tension handrail element as claimed in claim 1, which further includes at least one tension support, wherein said tension support is a steel cord, sheet steel or an aramide cord.

22. Endless, belt-shaped tension handrail element as claimed in claim 1, wherein the at least one joining point comprises a cross-linked and/or thermoplastic elastomer.

23. Method of producing an endless, belt-shaped tension handrail element for an escalator otravelator system comprising: providing at least one reinforcing layer on or in a belt-shaped tension element section, said belt-shaped tension element section having a longitudinal axis and comprising an elastomer, joining said tension element section and said at least one reinforcing layer to one another by heat treatment, inserting an insert piece at a joining point between two ends of the at least one reinforcing layer at an angle α relative to a longitudinal axis of said tension element wherein said ends of the at least one reinforcing layer overlap with and are joined to said insert piece thereby making said endless belt-shaped tension handrail element.

24. Method as claimed in claim 23, wherein the insert piece is composed of a same material as the at least one reinforcing layer.

25. Method as claimed in claim 24, wherein the insert piece is formed by cutting off an end piece of the at least one reinforcing layer.

26. Method as claimed in claim 23, wherein the ends of the at least one reinforcing layer are at least one of bonded, stitched, welded, fused, or clamped to the insert piece.

* * * * *